Patented Aug. 19, 1969

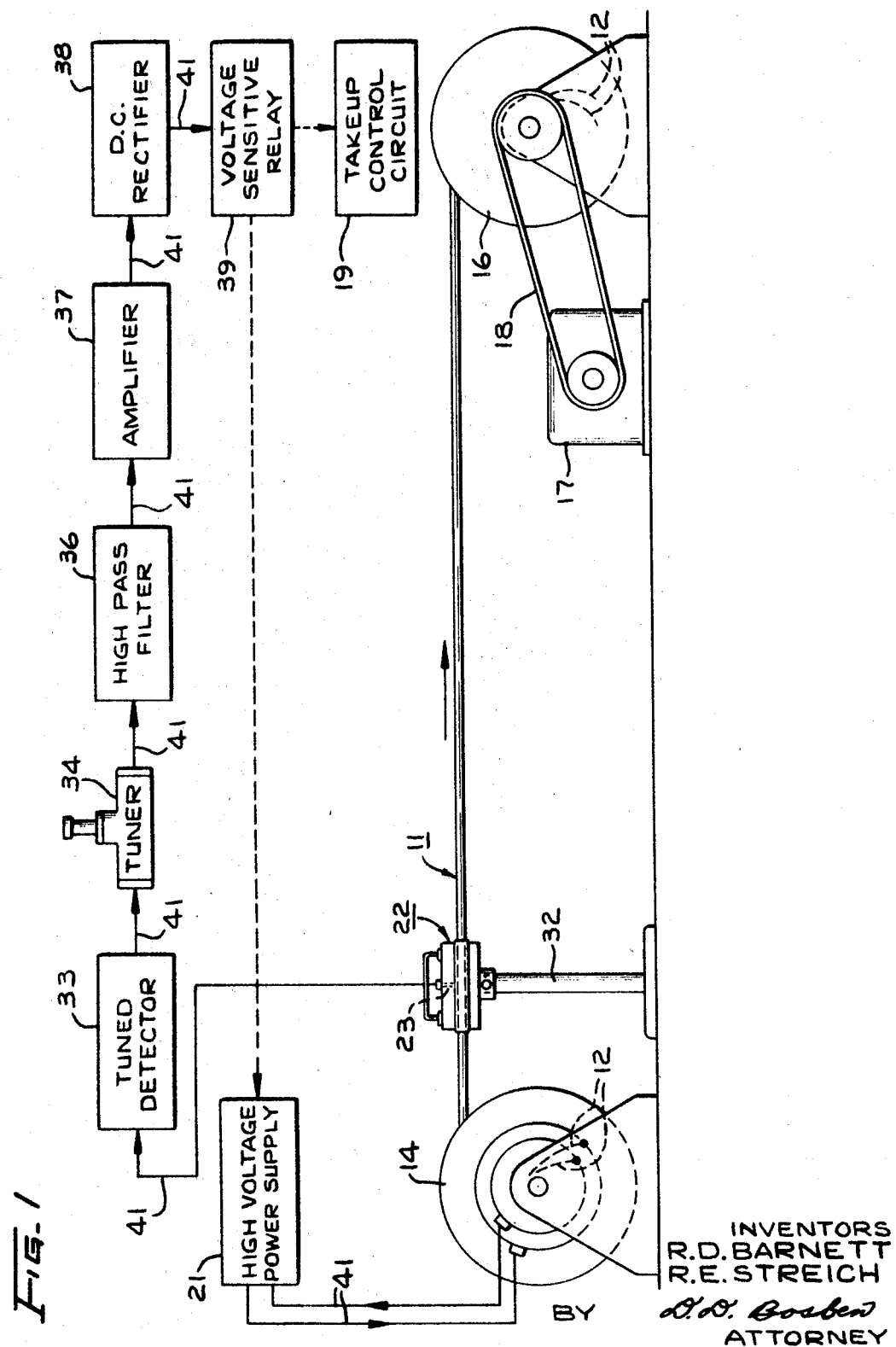

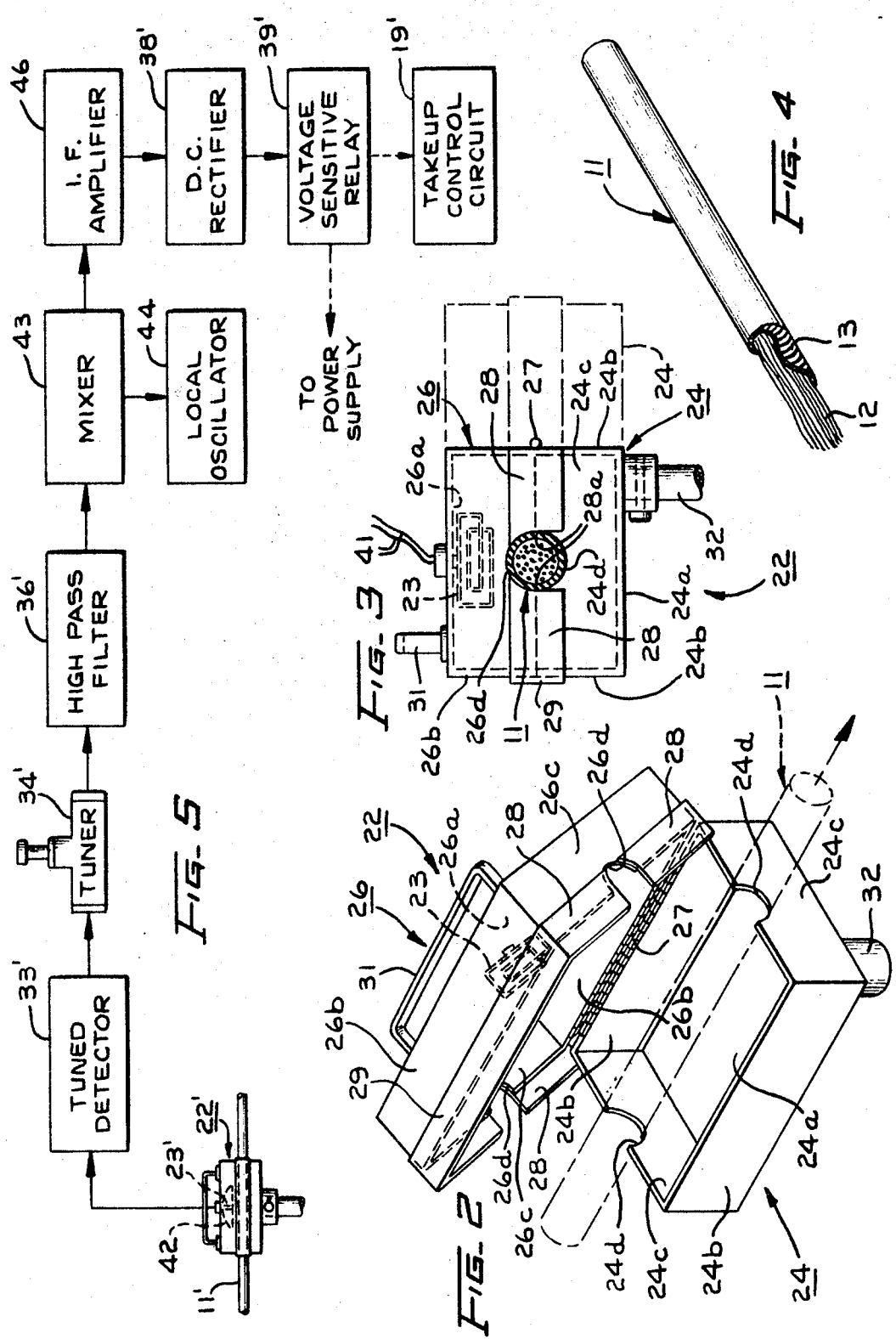

3,462,682
ULTRAHIGH FREQUENCY METHOD AND APPARATUS FOR LOCATING AN INSULATING FAULT BETWEEN TWO INSULATED ELECTRICAL CONDUCTORS
Richard D. Barnett, Phoenix, Ariz., and Robert E. Streich, Millard, Nebr., assignors to Western Electric Company, Incorporated, New York, N.Y., a corporation of New York
Filed Nov. 7, 1967, Ser. No. 683,431
Int. Cl. G01r 31/12
U.S. Cl. 324—54                    9 Claims

ABSTRACT OF THE DISCLOSURE

In locating a fault in insulated wires of a cable, the cable is advanced past a directional antenna mounted in an electrically shielded enclosure and forming a part of a fault detecting circuit tuned so as to be responsive only to radio frequency energy of a selected ultrahigh frequency (UHF), preferably in a range on the order of 1500–2000 mHz. A high insulation breakdown voltage is applied to the insulated wires of the advancing cable so as to cause arcing and thus the generation of radio frequency energy at the fault. The electrically shielded enclosure shields the antenna so that no substantial UHF energy is received by the antenna to cause energization of the fault detecting circuit until the fault enters the enclosure.

BACKGROUND OF THE INVENTION

Field of the invention

This invention relates to the detecting of faults in electrical insulation, and particularly to the locating of a fault in the insulation of two adjacent insulated wires.

In the manufacture of communication cable, it is standard practice to intertwist a pair of longitudinally advancing insulated wires to form a twisted wire pair. A plurality of twisted wire pairs then are fed into a cable strander which binds them into a cable core. Subsequently, in certain cables the cable core is passed through extrusion apparatus which extrudes a plastic jacket about the insulated wires. In other cables the cable core first is enclosed in a metal sheath, after which the sheathed core passes through extrusion apparatus which extrudes a plastic jacket about the sheath.

Occasionally, the insulation on two adjacent wires may be defective so as to cause a short between the wires. Accordingly, after a plurality of the twisted wire pairs have been bound into a cable core by the cable strander, particularly where the cable core subsequently is to be enclosed in a metal sheath, the insulated wires are connected to a high voltage source and tested for high voltage breakdown, and any wires found to have an insulating fault between them are noted. In this connection, an insulating fault may be between the wires of a twisted wire pair or between wires of adjacent twisted wire pairs. Subsequently, each insulating fault is located and repaired, if possible; of a fault cannot be repaired, the defective twisted wire pair or pairs involved are replaced.

Similarly, after a jacketing operation the insulated wires of a completed cable are connected to a high voltage source and tested for high voltage breakdown, and any wires which are found to have an insulating fault between them are noted. Subsequently, each insulating fault is located and the cable is cut transversely into sections to eliminate the fault, with the sections of the cable not containing a fault (providing they are of sufficient length) being shipped to the field, and with the section of the cable which contains the fault being scrapped.

Description of the prior art

In general, the locating of an insulating fault in a cable core or a jacketed cable is accomplished in a semi-automatic process in which the cable core or jacketed cable, as the case may be, is advanced from a supply reel and wound upon a takeup reel by a suitable takeup mechanism.

More specifically, in one type of apparatus for locating an insulating fault in a cable core or a jacketed cable, corresponding ends of the two insulated wires involved, such as the ends of the wires on the supply reel, are connected to a high voltage source while the other ends of the wires (on the takeup reel) are insulated from each other. Thus, as the cable core or jacketed cable is advanced the wires are subjected to high electrical stress so as to cause an electrical discharge at the fault.

In the past, various methods and apparatus have been proposed for detecting this electrical discharge to locate the fault. For example, some of the energy sensing devices which have been used include microphones of various types, induction coils, and devices responsive to the radio frequency energy being generated by the electrical discharge, including devices employing filters so as to be responsive only to a selected frequency. In other instances, an operator has relied solely on his senses (sight, hearing, and/or smell) to locate the point of the electrical discharge and thus the location of the fault.

Another type of apparatus for locating an insulating fault in a cable core or a jacketed cable includes a high voltage probe through or adjacent which the cable core or jacketed cable is advanced. As the insulating fault comes adjacent the high voltage probe the fault becomes subjected to high electrical stress so that ionization of the gas in the fault occurs and an electrical discharge is produced at the fault. The electrical discharge results in the generation of radio frequency energy which operates a detecting device, such as a radio receiver. In other known apparatus of this general type designed for locating a fault in a twisted wire pair prior to its being incorporated into a cable core, a circuit is completed through the probe and the wire involved (which is grounded) to operate a fault detecting device.

In another known system, an insulating fault between wires of a jacketed cable is located by connecting the wires as one leg of a high voltage bridge and then determining the distance of the fault from one end of the cable by the amount of unbalance in the bridge. The cable then is re-reeled to the estimated point of the fault and cut transversely at that point. The two resultant cable sections next are tested for high voltage breakdown to determine which one still contains the fault. An additional length of cable then is cut from the cable section still containing the fault, and this section is retested. This cutting and retesting procedure is repeated, if necessary, until the fault has been eliminated.

In general, the above described methods and apparatus have not proved satisfactory for locating an insulating fault in a cable core or a jacketed cable, for various reasons. For example, the actual pinpointing of the fault often becomes a laborious and time consuming process, and in certain instances it may be necessary to cut out sections of the cable core or jacketed cable by a trial and error method until the fault has been eliminated, thus wasting product which otherwise would have been acceptable for use in the field. In this connection, certain devices are not sensitive enough to be energized by the electrical discharge at a fault in a cable core, particularly where the fault is located internally of the cable core a substantial distance and thus insulated from the high voltage probe or the energy pickup unit of the device by the insulation of the intervening wires. This lack of sensitivity is further magnified in the case of a jacketed cable because of the insulating effect of the cable's plastic jacket. Further, even where a device is energized by the electrical discharge at the fault, it has been found that frequently it still is difficult to find the exact location of the fault since the energy being created at the fault by the electrical discharge is coupled to the surrounding wires and tends to be transmitted along the length of the cable core or the jacketed cable, whereby the fault tends to generate a signal of constant amplitude in the device even when the fault is a substantial distance (such as up to 100 feet) on either side of the detecting device.

SUMMARY OF THE INVENTION

An object of this invention is to provide a new and improved method and apparatus for detecting and/or locating faults in electrical insulation.

Another object of this invention is to provide a new and improved method and apparatus for detecting and/or locating a fault in the insulation between two adjacent insulated electrical conductors of a multiple conductor article, which is extremely accurate as compared to prior known apparatus.

A further object of this invention is to provide a new and improved method and apparatus for detecting and/or locating an insulating fault in a multiple conductor article, regardless of the location of the fault in the article with respect to the periphery of the article.

In accordance with the invention, the locating of an insulating fault between two insulated electrical conductors of a multiple conductor article involves tuning a fault detecting circuit so that it is responsive only to radio frequency energy in a selected ultrahigh frequency range and applying a relatively high insulation breakdown voltage to the insulated electrical conductors so that an electrical discharge and ultrahigh radio frequency energy are produced at an insulating fault between the electrical conductors. In addition, relative movement is caused between an ultrahigh frequency antenna of the fault detecting circuit such that successive portions of the article pass adjacent the antenna, and the antenna and the successive portions of the article are electrically shielded from ultrahigh radio frequency energy in the surrounding area such that substantially no ultrahigh radio frequency energy is received by the antenna to cause energization of the fault detecting circuit until the insulating fault comes adjacent the antenna.

More specifically, the fault detecting circuit is tuned so as to be responsive only to radio frequency energy in a range on the order of 1000 mHz. or above, and preferably in a range on the order of 1500–2000 mHz. Further, the shielding of the antenna and the successive portions of the article is accomplished by positioning two separable members of electrically conducting material, one of which has the antenna mounted thereon, relative to one another so as to form an enclosure through which the successive portions of the article pass adjacent the antenna during the relative movement of the article and the antenna.

BRIEF DESCRIPTION OF THE DRAWING

FIG. 1 is a schematic diagram of insulating fault locating apparatus in accordance with the invention;

FIG. 2 is an isometric view of an electrically shielded antenna device for use in the apparatus disclosed in FIG. 1, in an open, inoperative position;

FIG. 3 is an end elevational view of the electrically shielded antenna device shown in FIG. 2, in a closed, operative condition;

FIG. 4 is a jacketed cable having a cable core formed of a plurality of insulated twisted wire pairs; and FIG. 5 is a modified insulating fault locating apparatus in accordance with the invention.

DETAILED DESCRIPTION

Referring to FIG. 1, it is seen that the illustrated embodiment of the invention is designed for use in connection with the locating of an insulating fault (or faults) in an elongated multiple conductor strand in the form of a cable 11 known to contain the fault(s) as a result of having been subjected to a previous high voltage breakdown test. As is illustrated in FIG. 4, the cable 11 includes insulated electrical conductor wires 12 which have been twisted together to form twisted wire pairs, the twisted wire pairs being suitably bound together to form a cable core and being surrounded by an extruded plastic jacket 13.

Specifically, this embodiment of the invention is designed to locate a fault in the insulation between the electrical conductor wires 12 of one of the twisted wire pairs, or a fault in the insulation between the conductor wires of two adjacent ones of the twisted wire pairs, as the cable 11 is advanced from left to right in FIG. 1 from a supply reel 14 to a takeup reel 16. The takeup reel 16 is driven by a motor 17 through a drive mechanism 18, the operation of the motor being controlled by a suitable takeup control circuit 19.

Corresponding ends of the wires 12 known to have an insulating fault between them as a result of the above-mentioned high voltage breakdown test, such as the ends of the wires on the supply reel 14, are connected through suitable slip rings and brushes to a high voltage power supply 21, while the other ends of the wires (on the takeup reel 16) are insulated from one another (such as by being spaced about one inch apart), in a manner well known to those skilled in the art. Thus, as the cable 11 is advanced the defective insulated wires 12 are being subjected to high electrical stress, causing arcing at the insulating fault and the generation of radio frequency energy at the fault.

As the cable 11 is advanced from the supply reel 14 to the takeup reel 16, it passes through an electrically shielded enclosure 22 having an ultrahigh frequency sensing device 23, such as a directional antenna, mounted therein. In this connection, most of the radio frequency energy generated by the arcing at an insulating fault in the cable 11 tends to be coupled to the surrounding conductor wires of the cable and to be transmitted along the length of the cable internally thereof, while at the same time radiating outwardly from the cable along its length. However, in accordance with this invention it has been found that frequencies in the ultrahigh frequency region on the order of 1000 mHz. and above apparently propagate along the cable 11 adjacent its periphery such that the directional antenna 23 can be shielded from this energy. Accordingly, the electrically shielded enclosure 22 is constructed so as to shield the antenna 23 from ultrahigh frequency energy in the surrounding area, and also to attenuate the propagation of the ultrahigh frequency energy along the cable 11 from an insulating fault in the cable, thereby shielding the antenna from this energy until the fault enters the enclosure, at which time the radiating ultrahigh frequency energy from the fault is received by the antenna to cause energization of associated fault detecting circuitry.

More specifically, in the illustrated embodiment of the invention, as is shown in FIGS. 2 and 3, the electrically shielded enclosure 22 is in the form of a rectangular housing constructed of an electrically conducting material, such as brass. The housing 22 includes a lower box-like section 24 having a bottom wall 24a, side walls 24b and end walls 24c, and an upper box-like section 26 having a top wall 26a, side walls 26b and end walls 26c. Adjacent edges of two of the side walls 24b and 26b of the housing sections 24 and 26 are connected together by a suitable hinge 27 so that the sections are movable between an open position as shown in FIG. 2, in which the cable 11 can be positioned between the sections, and a closed solid line position as shown in FIG. 3, in which the upper section 26 rests on the lower section 24 by gravity so that the two sections enclose a portion of the cable. In this regard, the end walls 24c and 26c of the housing sections 24 and 26 are provided with semicircular recesses 24d and 26d which, when the sections are closed as shown in FIG. 3, form circular entrance and exit apertures for receiving the advancing cable 11 in close fitting relationship. The upper housing section 26 also has a pair of spaced electrically shielding flanges 28 on each of its end walls 26c and an electrically shielding flange 29 on one of its side walls 26b, the flanges being welded or otherwise suitably secured to their respective walls so as to depend downwardly in overlapping relationship with upper wall portions of the lower housing section 24 when the housing 22 is closed as shown in FIG. 3. The directional antenna 23 is mounted on the underside of the top wall 26a of the upper housing section 26 and the top wall has a lifting handle 31 (FIG. 3) secured to its upper side. The housing 22 is suitably supported on a vertically disposed support stand 32 for horizontal swinging movement between its operative solid line position in FIG. 3 and an inoperative dashed line position in FIG. 3, and may be releasably locked in either position by a suitable locking device.

The directional antenna 23 is connected to a detector 33 which is tuned to a selected ultrahigh frequency by a tuner 34. Preferably, the detector 33 is tuned to a frequency in a range on the order of 1500 to 2000 mHz., and for accurate results should not be tuned to a frequency which is substantially lower than 1000 mHz. Further, it is to be understood that the term "ultrahigh frequency" as used herein is being used in a broad sense and is intended to include certain higher frequencies sometimes classified as "super high" frequencies. In this connection, however, with frequencies substantially higher than 2000 mHz., such as 9000 mHz., difficulty in being able to shield the antenna 23 and the other parts of the apparatus adequately, may be encountered.

When an insulating fault in the cable 11 enters the electrically shielded housing 22, the ultrahigh frequency energy being generated by the arcing at the fault is recevied by the directional antenna 23 and feeds to the tuned detector 33. The ultrahigh frequency output signal of the detector 33 feeds to a high pass filter 36, and then through an amplifier 37 and a D.C. rectifier 38. The amplified and rectified signal then energizes a voltage sensitive relay 39 which opens a normally closed contact (not shown) in the takeup control circuit 19 to deenergize the takeup drive motor 17, thereby stopping the advancement of the cable 11. The voltage sensitive relay 39 also opens a normally closed contact (not shown) in the high voltage power supply 21, to disconnect it from the wires 12 under test. The cable 11 then can be cut transversely on either side of the located insulating fault, to cut the portion of the cable containing the fault out of the cable.

To reduce the possibility of stray ultrahigh frequency energy being picked up by the apparatus and being misinterpreted by the apparatus as a fault in the cable 11, in addition to the antenna 23 being shielded, the various other components of the fault detecting circuit (detector 33, tuner 34, etc.) and leads 41 for connecting the components should be adequately shielded. Preferably, the leads 41 are of a double shielded, coaxial type and the various components of the fault detecting circuit (antenna 23, detector 33, tuner 34, etc.) are of any suitable type compatible with this type of lead.

For example, assuming a high voltage power supply 21 of 20,000 volts and a 200 mHz. tuned system, the directional antenna 23 may be a loop antenna or a dipole antenna having a receiving frequency range on the order of 1800–2200 mHz.; the detector 33 may be of a coaxial crystal type, such as the model XM6040 sold by the Microlab Company of Livingston, N. J., provided with a model IN21 crystal of the same company and having a range of 1400 to 2300 mHz.; the tuner 34 may be the Microlab model 51–05N, which has a range of 500 to 3000 mMz.; the high pass filter 36 may be of a coaxial, band pass type, such as the Microlab model BK–4FN, which has a range of 1700 to 1900 mHz. and a 10% band width; the amplifier 37 may be the model A4608 sold by the Aertech Company of Mountain View, Calif., which has a range of 1650 to 1950 mHz. and a 20 decibel minimum gain; the rectifier 38 may be the model XM6040 detector mount with IN21 crystal of the Microlab Company in combination with a suitable R-C network for smoothing; and the voltage sensitive relay 39 may be the model 3917 of Bourns, Incorporated of Riverside, Calif. As an alternate antenna 23 and detector 33, the Microlab model B200A pickup and detector may be used.

The embodiment of the invention shown in FIG. 5 is similar to the embodiment of the invention disclosed in FIGS. 1, 2 and 3 in that it includes an electrically shielded housing 22' through which a cable 11' is advanced past an ultrahigh frequency directional antenna 23'; a detector 33' tuned to a selected ultrahigh frequency by a tuner 34'; and a high pass filter 36'. However, for greater fault detecting sensitivity the directional antenna 23' is provided with a parabolic reflector 42 and the output of the high pass filter 36' is fed to a mixer 43 in which it is beat with the frequency of a local oscillator 44, the resulting intermediate frequency output of the mixer then passing to an I.F. amplifier 46. Then, as in the embodiment of the invention shown in FIGS. 1, 2 and 3, the amplified signal is rectified by a suitable rectifier 38', and the amplified and rectified signal energizes a voltage sensitive relay 39', which opens a normally closed contact (not shown) in a takeup control circuit 19' to deenergize a takeup mechanism (not shown), thereby stopping the advancement of the cable 11'. The relay 39' also opens a normally closed contact in an associated high voltage power supply (not shown) to deenergize the power supply. The mixer 43, local oscillator 44 and I.F. amplifier 46 may be of any suitable type, such as the crystal mixer model 874MRL, local oscillator model 1218A (900 to 2000 mHz.) and I.F. amplifier model 1216A (30 mHz.), which are sold by the General Radio Corporation of West Concord, Mass. In this arrangement, the rectifier 38' may be the Microlab model XA–0040 detector mount with IN23 crystal in combination with a suitable R-C network for smoothing.

The embodiment of the invention shown in FIG. 5, while requiring more components than the arrangement shown in FIGS. 1, 2 and 3, is more sensitive than the apparatus of FIGS. 1, 2 and 3 and is particularly desirable where the ultrahigh frequency energy signal from an insulating fault in the cable 11' may be relatively weak. The arrangement of FIG. 5 also is advantageous in that the intermediate frequency output signal of the mixer 43 can be more readily amplified to operate the voltage sensitive relay 39', than can the ultrahigh frequency output signal of the high pass filter 36 to operate the voltage sensitive relay 39. Further, as a result of the use of a relay energizing signal of a lower frequency, shielding of the leads 41 and the other parts of the apparatus is less critical in the apparatus of FIG. 5 than it is in the embodiment of the invention shown in FIGS. 1, 2 and 3.

OPERATION

In the operation of the apparatus disclosed in FIGS. 1, 2 and 3, the locating of an insulating fault in the cable 11 may be accomplished directly by connecting the leading end of the cable to the takeup reel 16 and then advancing the cable from the supply reel 14 through the electrically shielded housing 22, while applying a high electrical stress to the insulated wires 12 involved from the high voltage power supply 21. However, since continuous arcing at the fault over an extended period of time may cause additional damage to the insulation of the adjacent wires 12 or may actually cause fusing of the wires involved in the fault so that the arcing stops before the fault reaches the housing 22, it is preferable that the approximate location of the fault first be determined by a suitable bridge unbalance method, in a manner well known to those skilled in the art.

The leading end of the cable 11 then may be connected to the takeup reel 16 and, with the electrically shielded housing 22 swung into its inoperative dashed line position in FIG. 3 so that it is removed from the cable, the cable is advanced rapidly to a point about 100–200 feet in advance of the estimated position of the fault. The housing 22 then is swung into position adjacent the cable 11 and locked therein, and the cable is positioned in the semicircular recesses 24d of the housing end walls 24c, as illustrated in FIG. 2. The housing 22 then is closed as shown in solid lines in FIG. 3, with the upper housing section 26 resting on the lower housing section 24 by gravity so that the housing sections enclose a portion of the cable 11. Further, the ends of the wires 12 between which the insulating fault exists, such as the ends of the wires on the supply reel 14, are connected to the high voltage power supply 21 through the above-mentioned slip rings and brushes, while the other ends of the wires, on the takeup reel 16, are insulated from each other. The high voltage power supply 21 then is energized and the takeup control circuit 19 is operated to energize the motor 17, whereby the motor drives the takeup reel 16, through the drive mechanism 18, to advance the cable 11 from left to right as viewed in FIG. 1.

As the cable 11 is being advanced the defective insulated wires 12 are subjected to high electrical stress, causing arcing at the insulating fault and the generation of radio frequency energy at the fault. While this radio frequency energy tends to be transmitted along the length of the cable 11, the electrically shielded housing 22 attenuates the propagation of the ultrahigh frequency energy along the cable from the insulating fault, thereby shielding the ultrahigh frequency directional antenna 23 in the housing from this energy until the fault enters the housing, and also shields the antenna from ultrahigh frequency energy in the surrounding area. Thus, the antenna 23 receives substantially no ultrahigh frequency energy until the fault enters the housing 22.

When the insulating fault in the cable 11 enters the electrically shielded housing 22 the ultrahigh frequency energy being generated by the arcing at the fault is received by the directional antenna 23 and feeds to the detector 33, which has been tuned to a selected ultrahigh frequency. The ultrahigh frequency output signal of the detector 33 feeds to the high pass filter 36, and then is amplified and rectified in the amplifier 37 and the D.C. rectifier 38, respectively. The amplified and rectified signal then energizes the voltage sensitive relay 39, which opens the above-mentioned contact (not shown) in the takeup control circuit 19 to deenergize the takeup drive motor 17 and thereby stop the advancement of the cable 11, and which opens the above-mentioned contact in the high voltage power supply 21 to disconnect the power supply from the wires 12 under test. The cable 11 then is cut transversely on either side of the located insulating fault, to cut the portion of the cable containing the fault out of the cable.

The operation of the apparatus disclosed in FIG. 5 is substantially the same as the operation of the apparatus of FIGS. 1, 2 and 3, except that in the apparatus of FIG. 5 the parabolic reflector 42 associated with the directional antenna 23′ increases the ultrahigh frequency energy pickup sensitivity of the antenna. Further, the output of the high pass filter 36′ is fed to the mixer 43 and beat with the frequency of the local oscillator 44, the resulting intermediate frequency output of the mixer then being amplified in the I.F. amplifier 46 and rectified by the D.C. rectifier 38′. The amplified and rectified signal then operates the voltage sensitive relay 39′, which causes deenergization of its associated power supply (not shown) and which opens its contact (not shown) in the takeup control circuit 19′ to deenergize its associated takeup mechanism (not shown), thereby stopping the advancement of the cable 11′.

What is claimed is:
1. The method of locating an insulating fault between two insulated electrical conductors of a multiple conductor article, which comprises:
   tuning an insulating fault detecting means which includes an ultrahigh frequency antenna means so that the fault detecting means is responsive only to radio frequency energy in a selected ultrahigh frequency range;
   causing relative movement between the article and the ultrahigh frequency antenna means such that successive portions of the article pass adjacent the antenna means;
   connecting a relatively high insulation breakdown voltage across the insulated electrical conductors at a point spaced from the ultrahigh frequency antenna means and such that an electrical discharge and ultrahigh radio frequency energy are produced at an insulating fault between the electrical conductors as the fault approaches and passes adjacent the antenna means; and
   electrically shielding the ultrahigh frequency antenna means and the successive portions of the article from ultrahigh radio frequency energy in the surrounding area, including ultrahigh radio frequency energy which is produced at the insulating fault between the insulated electrical conductors and which tends to propagate from the fault adjacent the periphery of the article, such that substantially no ultrahigh radio frequency energy is received by the antenna means to cause energization of the fault detecting means until the insulating fault comes adjacent the antenna means.

2. The method of locating an insulating fault between two insulated electrical conductors of a multiple conductor article, as recited in claim 1, in which:
   the article is in the form of a relatively elongated multiple conductor strand;
   the electrical shielding of the antenna means and the successive portions of the article also involves electrically shielding a space adjacent the antenna means; and
   the relative movement caused between the antenna means and the article is such that the successive portions of the article pass through the electrically shielded space as they pass adjacent the antenna means.

3. The method of locating an insulating fault between two insulated electrical conductors of a multiple conductor article, as recited in claim 1, in which the ultrahigh frequency range is on the order of 1000 mHz. or above.

4. The method of locating an insulating fault between two insulated electrical conductors of a multiple conductor article, as recited in claim 1, in which the ultrahigh frequency range is on the order of 1500 to 2000 mHz.

5. Apparatus for locating an insulating fault between two insulated electrical conductors of a multiple conductor article, which comprises:
   fault detecting means tuned so as to be respective only to radio frequency energy in a selected ultrahigh frequency range;
   ultrahigh frequency antenna means forming a part of said fault detecting means for receiving ultrahigh radio frequency energy so as to cause energization of said fault detecting means;
   means for causing relative movement between said antenna means and the article such that successive portions of the article pass adjacent said antenna means;
   means for connecting a relatively high insulation breakdown voltage across the insulated electrical conductors at a point spaced from said antenna means and such that an electrical discharge an ultrahigh radio frequency energy are produced at an insulating fault between the electrical conductors as the fault approaches and passes adjacent said antenna means; and means for electrically shielding said antenna means and the successive portions of the article from ultrahigh radio frequency energy in the surrounding area, including ultrahigh radio frequency energy which is produced at the insulating fault between the insulated electrical conductors and which tends to propagate from the fault adjacent the periphery of the article, such that substantially no ultrahigh radio frequency energy is received by said antenna means to energize said fault detecting means until the insulating fault comes adjacent said antenna means.

6. Apparatus for locating an insulating fault between two insulated electrical conductors of a multiple conductor article, as recited in claim 5, in which said fault detecting means is tuned to be responsive only to radio frequency energy in a range on the order of 1000 mHz. or above.

7. Apparatus for locating an insulating fault between two insulated electrical conductors of a multiple conductor article, as recited in claim 5, in which said fault detecting means is tuned to be responsive only to radio frequency energy in a range on the order of 1500 to 2000 mHz.

8. Apparatus for locating an insulating fault between two insulated electrical conductors of an elongated multiple conductor strand, which comprises:

fault detecting means tuned so as to be responsive only to radio frequency energy in a selected ultrahigh frequency range;

an electrically shielded enclosure having entrance and exit openings for receiving the strand so that a portion of the strand extends through said enclosure;

ultrahigh frequency antenna means forming a part of said fault detecting means and mounted within said electrically shielded enclosure so as to receive radio frequency energy from an insulating fault when the fault is in said enclosure, to cause energization of said fault detecting means;

means for causing relative movement between the strand and said electrically shielded enclosure such that successive portions of the strand pass adjacent said antenna means and through said enclosure; and means for connecting a relatively high insulation breakdown voltage across the insulated electrical conductors of the strand at a point from said antenna means, such that an electrical discharge and ultrahigh radio frequency energy are produced at an insulating fault between the insulated electrical conductors as the fault approaches and passes adjacent said antenna means, said enclosure shielding said antenna means from ultrahigh radio frequency energy outside of said enclosure, including ultrahigh radio frequency energy which is produced at the fault and which tends to propagate from the fault adjacent the periphery of the strand, such that substantially no ultrahigh radio frequency energy is received by said antenna means to cause energization of said fault detecting means until the fault enters said enclosure.

9. Apparatus for locating an insulating fault between two insulated electrical conductors of an elongated multiple conductor strand, as recited in claim 8, in which said electrically shielded enclosure comprises:

at least two separable sections positionable relative to one another so as to enclose a portion of the strand, when said antenna means being mounted on one of said sections.

References Cited

UNITED STATES PATENTS

| | | | |
|---|---|---|---|
| 2,537,737 | 1/1951 | Chamberlin | 325—28 XR |
| 2,635,136 | 4/1953 | Duffy | 324—54 |
| 2,704,825 | 3/1955 | Martin et al. | 324—54 |
| 2,882,491 | 4/1959 | Gooding | 324—54 |
| 2,996,664 | 8/1961 | Vogel et al. | 324—54 |
| 3,015,774 | 1/1962 | Eigen | 324—54 |
| 3,045,281 | 7/1962 | Skobel | 324—54 XR |
| 3,156,863 | 11/1964 | Wakefield | 324—54 |
| 3,173,086 | 3/1965 | Kresge | 324—54 XR |
| 3,229,199 | 1/1966 | Mildner | 324—54 |
| 3,370,226 | 2/1968 | Widmer | 324—54 |

GERARD R. STRECKER, Primary Examiner

UNITED STATES PATENT OFFICE
CERTIFICATE OF CORRECTION

Patent No. 3,462,682    Dated August 19, 1969

Inventor(s) Richard D. Barnett - Robert F. Streich

It is certified that error appears in the above-identified patent and that said Letters Patent are hereby corrected as shown below:

Column 1, line 61, "of" should be --if--. Column 5, line 73, "$mM_z$" should be --$mH_z$--. Claim 5, line 60, "respective" should be --responsive--; line 74, "an" (second occurrence) should be --and--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents